United States Patent
Sroka et al.

(10) Patent No.: US 8,364,571 B1
(45) Date of Patent: Jan. 29, 2013

(54) METHOD OF AND SYSTEM FOR TRADING OF SYNTHETIC ASSETS

(75) Inventors: Michael M. Sroka, Dallas, TX (US); Phillip Drayer, Dallas, TX (US)

(73) Assignee: Cantor Entertainment Data, LP, New York, NY (US)

( * ) Notice: Subject to any disclaimer, the term of this patent is extended or adjusted under 35 U.S.C. 154(b) by 886 days.

(21) Appl. No.: 11/893,715

(22) Filed: Aug. 17, 2007

Related U.S. Application Data (60) Provisional application No. 60/822,819, filed on Aug. 18, 2006, provisional application No. 60/839,543, filed on Aug. 23, 2006, provisional application No. 60/844,288, filed on Sep. 13, 2006, provisional application No. 60/916,637, filed on May 8, 2007.

(51) Int. Cl.
*G06Q 40/00* (2006.01)
(52) U.S. Cl. .......................................... 705/37
(58) Field of Classification Search ............ 705/35, 705/36 R, 37
See application file for complete search history.

(56) References Cited

U.S. PATENT DOCUMENTS

| | | | | |
|---|---|---|---|---|
| 5,943,678 | A * | 8/1999 | Hocker et al. | 715/202 |
| 6,629,082 | B1 * | 9/2003 | Hambrecht et al. | 705/36 R |
| 2002/0087373 | A1 * | 7/2002 | Dickstein et al. | 705/7 |
| 2002/0087454 | A1 * | 7/2002 | Calo et al. | 705/37 |

* cited by examiner

*Primary Examiner* — Mary Cheung
*Assistant Examiner* — Daniel L Greene (57) ABSTRACT

A method of and system for trading of synthetic assets is disclosed. A plurality of fractional interests in a synthetic asset are created, and the plurality of fractional interests are designated as IPO fractional interests. An initial price of the plurality of fractional interests is determined, and the plurality of fractional interests are made available in a primary market. A first user indicates a desire to acquire at least one of the plurality of fractional interests and provides funds. The fractional interests are transferred to an account associated with the first user and a portion of the funds are designated as reserved funds. A second user submits a request indicating a desire to acquire at least one of the plurality of fractional interests. The reserved funds of the first user are as free funds of the first user, and free funds of the second user are transferred to the first user. The fractional interests of the first user are transferred to the second user.

17 Claims, 8 Drawing Sheets

| | Football | Baseball | Basketball | Soccer | Rugby | Tennis | Literature | Racing | Hockey | |
|---|---|---|---|---|---|---|---|---|---|---|
| Boxing | PORTFOLIO | | | | | | | | | Celebrities |
| | Property | Symbol | Shares | Current | Total Market Cap. | % Owned | Change | | | |
| Music | Madonna (IPO) | MDNA | 1 | $22.65 | $107,000 | .02 | ↑$0.65 | | | Movies |
| | New York Yankees | NYY | 10 | $10.23 | $33,000 | .31 | ↓$0.22 | | | |
| Golf | Tom Brady | TBDY | 22 | $5.01 | $52,000 | .21 | ↑$0.45 | | | Skiing |
| News Central | World of Adventure Divine Shield | WADS | 1 | $1.99 | $1.99 | 100 | ↑$0.02 | | | Member Login |
| Fantasy Leagues | BUY ORDERS | | | | FUNDS | | | | | New Member |
| | Troy Aikman | | $10.00 | | Free funds: | $750 | | | | |
| | Steve Young | | $5.00 | | Reserved Funds: | | | | | |
| The Company | SELL ORDERS | | | | Symbol | Shares | Price | | | Help Desk |
| | New York Yankees | | $11.00 | | MDNA | 1 | $10.00 | | | |
| | AROD 2.50 ↑.25 | TO 8.50 ↓.56 | | BRER 3.22 ↓.67 | | DBOY 4.35 ↑.33 | | | | |
| | Trading Floor | Shopping Mall | Search Bar | | | Social Network | Digital Library | | | |

METHOD OF AND SYSTEM FOR TRADING OF SYNTHETIC ASSETS

CROSS REFERENCE TO RELATED APPLICATIONS

The patent application claims priority to U.S. Provisional Patent Application No. 60/822,819, filed on Aug. 18, 2006, and entitled "Method of and System for Trading of Synthetic Ownership Interests in Personalities," the disclosure of which is incorporated fully herein.

This patent application claims priority to U.S. Provisional Patent Application No. 60/839,543, filed on Aug. 23, 2006, and entitled "Method of and System for Trading of Synthetic Ownership Interests in Personalities," the disclosure of which is incorporated fully herein.

This patent application claims priority to U.S. Provisional Patent Application No. 60/844,288, filed on Sep. 13, 2006, and entitled "Method of and System for Trading of Synthetic Ownership Interests in Personalities," the disclosure of which is incorporated fully herein.

This patent application claims priority to U.S. Provisional Patent Application No. 60/916,637, filed on May 8, 2007, and entitled "Method of and System for Trading of Synthetic Ownership Interests in Personalities," the disclosure of which is incorporated fully herein.

BACKGROUND OF THE INVENTION

The present disclosure relates in general to synthetic assets.

DETAILED DESCRIPTION

Certain embodiments of the present invention relate to acquiring, purchasing and selling of synthetic assets. A synthetic asset is an intangible representation of a real or fictitious person, place, thing, or object, or any combination or grouping of the foregoing. Example synthetic assets include athletes, celebrities, politicians, literary characters, musicians, cartoons, personalities, people, friends, news, news events, virtual reality objects, items, assets, or property, actors, sports teams, sports players, sports leagues, geographic locations, buildings, structures, animals, political entities, business entities, weather, natural disasters, events, professions, religions, nationalities, commodities, minerals, natural resources, agricultural products, stocks, bonds, energy sources, diseases, speeches, advertisements, songs, lyrics, art, time slots, or any entity, idea or quality capable of being perceived, known or thought to have an existence, or any combination of one or more of the foregoing. One embodiment of a synthetic asset is an artificial, intangible, created property right with no intrinsic value in a person or groups of people, or in persons, or of places or things. The present disclosure describes embodiments that enable users to own or control synthetic assets or fractional interests in synthetic assets. The present disclosure also describes embodiments that enable users to acquire, buy, and sell synthetic assets or fractional interests in synthetic assets. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
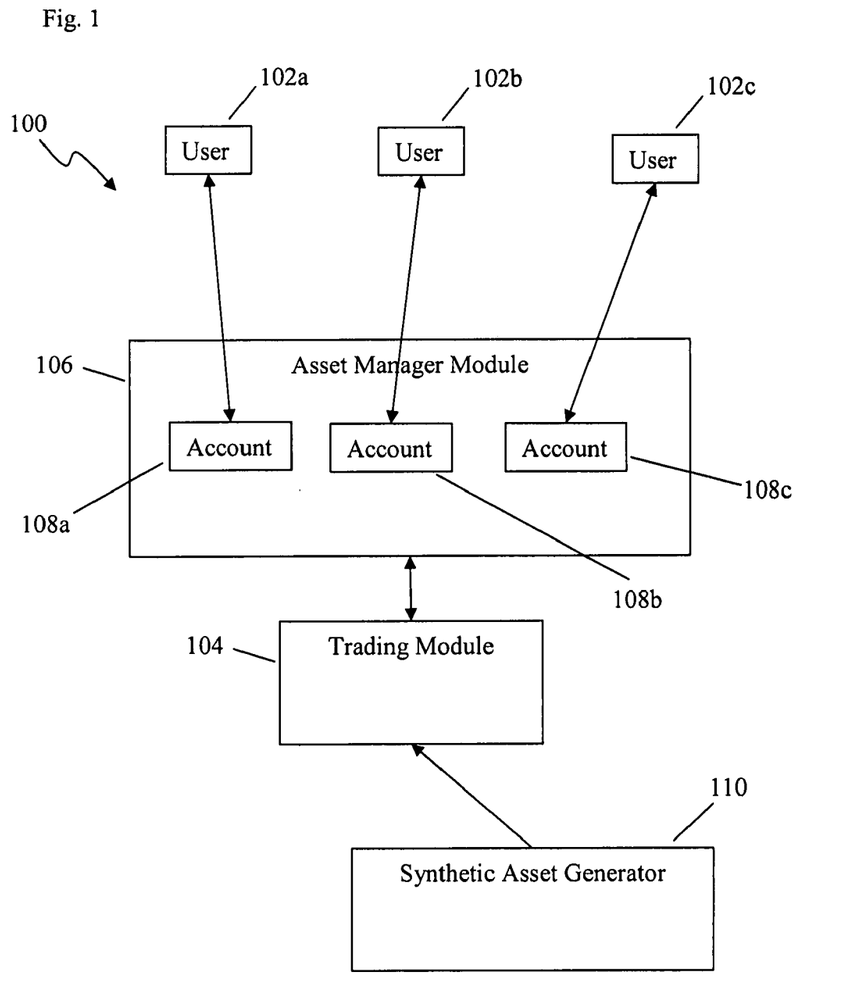
FIG. 1 is a schematic illustration of a system of an embodiment of the present invention.

Referring now to FIG. 1, a schematic illustration of a system 100 of an embodiment of the present invention is shown. In system 100, a series of users 102a, 102b, and 102c interact with an asset manager module 106. In connection with asset manager module 106, are accounts 108a, 108b, and 108c. A trading module 104 communicates with asset manager module 106 and a synthetic asset generator 110.

In one embodiment, users 102 interact asset manager module 106 over a network utilizing a single-entry Uniform Resource Locator (URL) internet-based system that permits both public and private access. The asset manager module 106 can allow the users 102 access to a feature-rich web-based experience. In one embodiment, asset manager module 106 can provide a complete suite of information and data about news, movies, music, politicians, books, cartoons, celebrities, sports, personalities, virtual reality objects and property, and other information. In addition, on one embodiment, asset manager module 106 may contain functionality to enable users 102 to purchase products and services.

Trading module 104 facilitates the allocation, purchase and sale of synthetic assets. In one embodiment, a synthetic asset can be broken into fractional interests. In one embodiment, trading module 104 includes a primary and a secondary market. The primary market allocates synthetic assets (or fractional interests in the synthetic assets) generated by the synthetic asset generator 110. In one embodiment, the primary market enables the buying and selling of synthetic assets (or fractional interests in the synthetic assets). The synthetic assets distributed in the primary market of trading module 104 may be designated as Initial Public Offering (IPO) synthetic assets (or, if fractional interests are distributed, IPO fractional interests). The secondary market is a marketplace for the buying and selling of synthetic assets (or fractional interests in the synthetic assets) based on prices determined by market conditions, including positions acquired either in the primary market and positions acquired in the secondary market. In one embodiment, commissions for each secondary market trade may be assessed on the buying user, selling user, or both.

In one embodiment, fractional interests can have a minimum price and a maximum price and trading module 104 monitors the price of the fractional interests. As the actual price of a fractional interest moves up in the secondary market and reaches the maximum price, then trading module 104 can increase the number of the fractional interests (and correspondingly, reduce the price based on the increase of fractional interests) until the price for the fractional interest drops below the maximum price. Similarly, as the actual price of a fractional interest moves down in the secondary market and reaches the minimum price, then trading module 104 can reduce the number of the fractional interests (and correspondingly, increase the price based on the decrease in fractional interests) until the price for the fractional interest is above the minimum price.

Asset manager module 106 has the capability to interact with users 102 and manage accounts 108. Each user 102 would have an account 108. In one embodiment, asset manager module 106 would require that user 102 deposit funds with the asset manager module 106 before an account 108 would be created for that user. The deposit of funds could be performed by submitting a check, credit card, debit card, wire transfer, electronic fund transfer, or any other form of payment. In one embodiment, funds would correspond to actual currency. In another embodiment, funds may correspond to a virtual form of currency. In a further embodiment, actual currency would be deposited and converted to a virtual form of currency.

In one embodiment, each account would be capable of designating the funds as either "free funds" or "reserved funds." In a further embodiment, when the funds are initially deposited, the funds would be designated as "free funds." Free funds are those funds in an account 108 that are not reserved against any fractional interest and may transferred out of account 108 by user 102 or used by user 102 to purchase a synthetic asset, or other goods and services. Reserved funds are those funds in a user's account 108 that are reserved against one or more synthetic assets (or fractional interests). In one embodiment, the reserved funds may not be transferred out of account 106 by user 102 or used in any manner by user 102 until user 102 liquidates the user's position in the fractional interest against which the funds are reserved or until the synthetic asset is dissolved; however, while the reserved funds may not be transferred out of account 106 by user 102, the reserved funds is nevertheless retained in the user's account 108. The reserved funds is owned by user 102, but cannot be retrieved by user 102 until user 102 liquidates the user's position in the fractional interest against which the funds are reserved or until the synthetic asset is dissolved.

Synthetic asset generator 110 generates synthetic assets. Synthetic asset generator 110 is capable of determining the initial aggregate number of fractional interests to be issued for each synthetic asset and the price at which the synthetic asset may be initially offered to users. Once the aggregate number of fractional interests and price of the fractional interests for a given synthetic asset have been determined, the synthetic asset is made available to trading module 104. In one embodiment, the price may be set to zero. Additionally, no price may be set at all.

Figure 2:
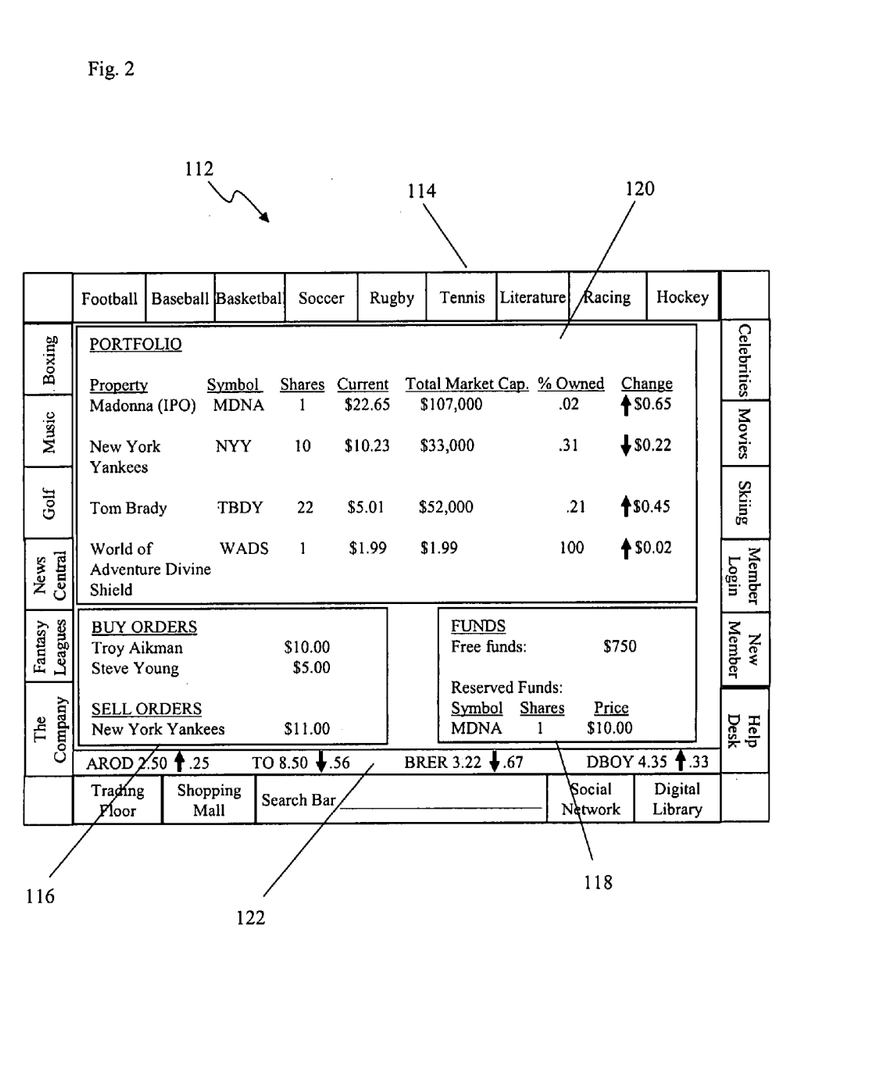
FIG. 2 is an illustration of an example graphical user interface of an embodiment of the present invention.

Referring now to FIG. 2, an illustration of an example graphical user interface 112 of an embodiment of the present invention through which a user 102 might interact with the asset manager module. Graphical user interface 112 is comprised of a series of topics 114, a funds position summary 116, a buy-sell summary 118, a portfolio summary 120, and a ticker 122. Other links and interface elements could also be implemented to provide additional information or functionality.

In one embodiment, graphical user interface 112 is a web-based account-management tool that provides individual users the ability to view and manage their individual accounts. Ticker 122 can be a real-time value crawl showing the change in value in the synthetic assets (or fractional interests) and can provide a user with the real-time information for each synthetic asset being traded. In one embodiment, each synthetic asset has a corresponding four-letter designator that appears next to the current value of the synthetic asset as it appears on ticker 122.

Additional aspects of graphical user interface 112 can include having a user-defined section that creates a personalized profile of information selected from an array of material available from the system. For example, the user might personalize the profile with news about specific synthetic assets or other sports and entertainment related activities. Further, an advertising and product-purchase section could be used for advertising various products and services and also providing the user with the ability to purchase any of various advertised products or services. In another embodiment, graphical user interface 112 may facilitate social networking. In another embodiment, graphical user interface 112 may facilitate audio or video broadcasting and conferencing.

Figure 3:
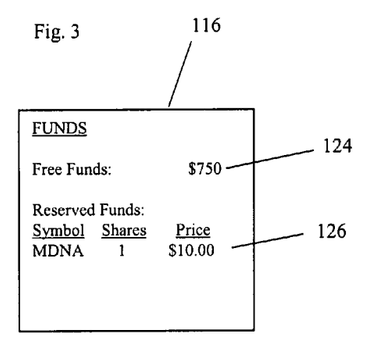
FIG. 3 is an example embodiment of a funds position summary in one embodiment of the present invention.

Referring now to FIG. 3, an example embodiment of funds position summary 116 is shown. In this embodiment, funds position summary 116 is shown in two categories: free funds 124 and reserved funds 126.

Figure 4:
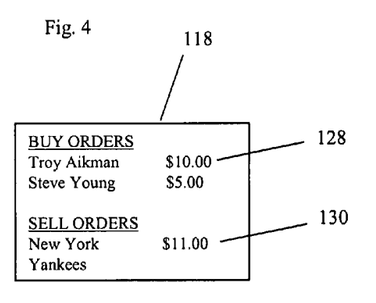
FIG. 4 is a depiction of a purchase position in one embodiment of the present invention.

Referring now to FIG. 4, an example embodiment of buy-sell summary 118 is shown. In this embodiment, buy-sell summary is shown as having buy requests 128 and sell requests 130.

Figure 5:
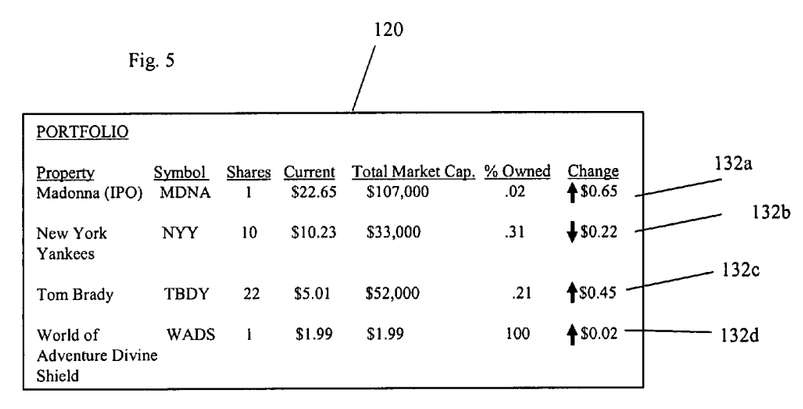
FIG. 5 is a depiction of a synthetic asset portfolio in one embodiment of the present invention.

Referring now to FIG. 5, an example embodiment of portfolio summary 120 is shown. In this embodiment, portfolio summary 120 shows several synthetic assets 132a, 132b, 132c, and 132d. For each synthetic asset 132, portfolio summary 120 can provide the synthetic asset's name, ticker symbol, the number of fractional interests of that synthetic asset owned, the current price of a fractional interest of that synthetic asset, the total market capitalization of that synthetic asset, the percent ownership of that synthetic asset, and the change in value of fractional interests of that synthetic asset. Portfolio summary 120 can also provide the last trade price, last trade date, last trade time, bid, and ask information pertaining to a synthetic asset. In addition, in this embodiment, synthetic asset 132a is displayed as an IPO fractional interest to indicate that it was purchased from the primary market. One manner of identifying an asset as an IPO fractional interest is to tag a field in a database associated with the fractional interest or associating a value with the fractional interest.

Figure 6:
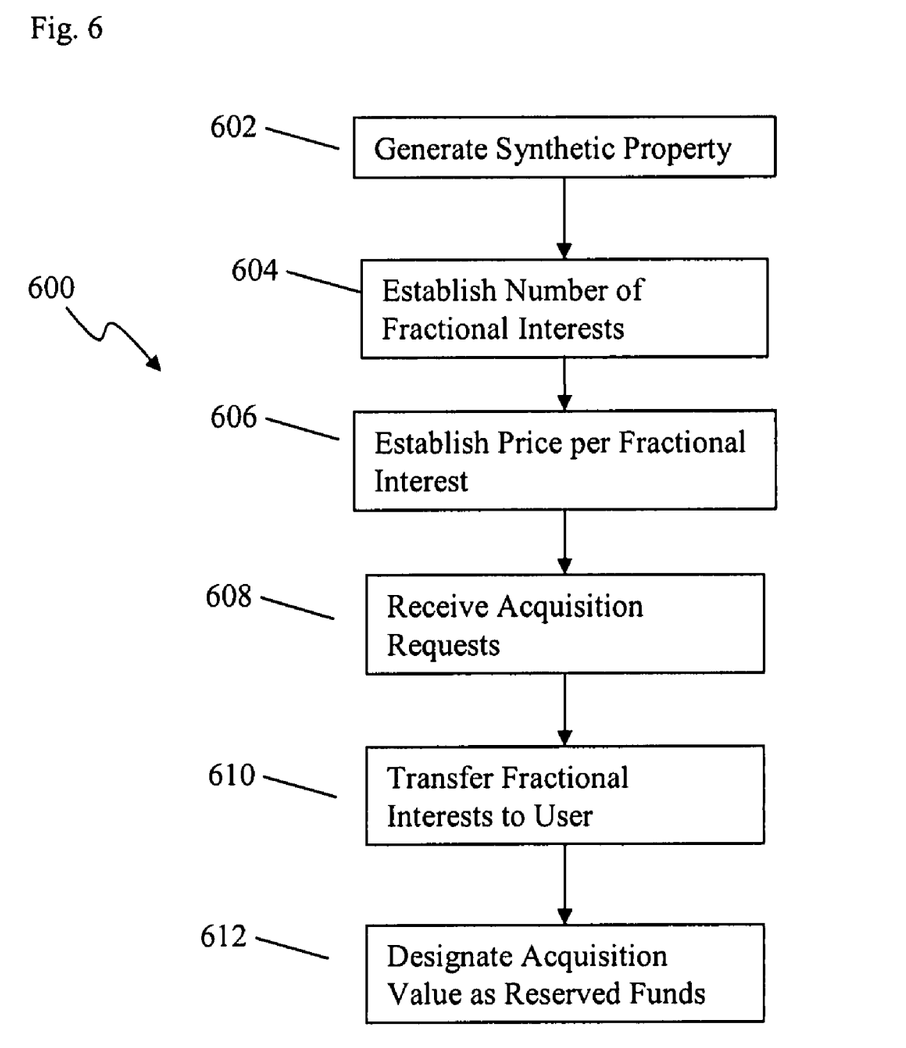
FIG. 6 is a flow diagram of the generation of a synthetic asset and subsequent acquisition in an embodiment of the present invention.

Referring now to FIG. 6, a flow diagram of the generation of a synthetic asset and subsequent acquisition is shown. At step 602, a synthetic asset is generated. In one embodiment, the synthetic asset is generated by a committee of individuals who select the synthetic asset based on demand and other factors and inputs the synthetic asset into the system using a computer interface. For example purposes, a celebrity named "Rock Star" will be selected and input into a relational database. While a faux celebrity is used in this example, it is understood that real individuals are contemplated within the scope of the invention.

At step 604, the system establishes the number of fractional interests to be associated with the generated synthetic asset. For certain synthetic asset there may be only a single fractional interest, such as for those instances where only one user should own that piece of a synthetic asset. In other instances, multiple fractional interests could be established. In one embodiment, the committee that generated the synthetic asset also determine the number of fractional interests. Continuing the previous example, the number of fractional interests for "Rock Star" would be set at 10,000.

At step 606, a price is set for each fractional interest for the synthetic asset. The price could be set based on the number of requests from users for a particular synthetic asset. Alternatively, the price could be arbitrarily assigned. In one embodiment, the price for all newly generated synthetic assets could be a fixed number and the number of fractional interests will be dictated by demand. The process of establishing the aggregate number, step 604, and price of a synthetic asset, step 606, may be managed by a committee that analyzes elements that may include past and current information about the synthetic asset, public perception of the synthetic asset, and various market conditions that influence value perception for the synthetic asset. Continuing the example, the fractional interests for "Rock Star" would be set at $1 per fractional interest.

At step 608, acquisition requests are received. An acquisition request indicates the number of fractional interests of the synthetic asset that a user would be willing to acquire. In one embodiment, the system will determine whether there is enough free funds within the account associated with the user submitting the acquisition request to fulfill the acquisition request. In another embodiment, before a user could submit a acquisition request, the user would be required to establish an account and have deposited funds equal to or greater than the amounts in the acquisition request. For example, if a user submitted that he wanted to acquire 5 fractional interests of "Rock Star," the system would determine if that user had at least $5 in free funds in his account.

At step 610, the fractional interests are transferred to the portfolio in the account associated with the user that submitted the acquisition request. For example, the user has requested to acquire 5 fractional interests of "Rock Star," so the system will transfer 5 of the 10,000 fractional interests to the user's portfolio.

In the event that the acquisition requests received exceed the number of fractional interests available for a synthetic asset, the system may transfer the fractional interests to users based on a number of methods. In one embodiment, allocation of the fractional interests may be a "first come, first served" basis. In another embodiment, allocation of the fractional interests may be prioritized based on the length of time a user has had an account, the amount of time a user has spent using the system, the number of requested fractional interests, previous buy and sell activity, amount of free funds in the user's account, or other metrics, or any combination of one or more of the foregoing.

At step 612, the value to acquire the fractional interests is designated as reserved funds within the account associated with the user. Continuing the example, assume that the user had $100 in free funds in his account. By acquiring 5 fractional interests of "Rock Star," $5 of the free funds would be designated as reserved funds. In one embodiment, the reserved funds are designated against the acquired fractional interests. As a result, the user's funds summary would be $95 in free funds and $5 in reserved funds and the user would own 5 IPO fractional interests of "Rock Star." In an example embodiment, the reserved funds representing the value of purchase of the synthetic asset remains reserved funds for the entire period the user owns the synthetic asset.

In one embodiment, no value is designated as reserved funds. In this embodiment, the fractional interests would be allocated without a corresponding designation of free funds as reserved funds.

Figure 7:
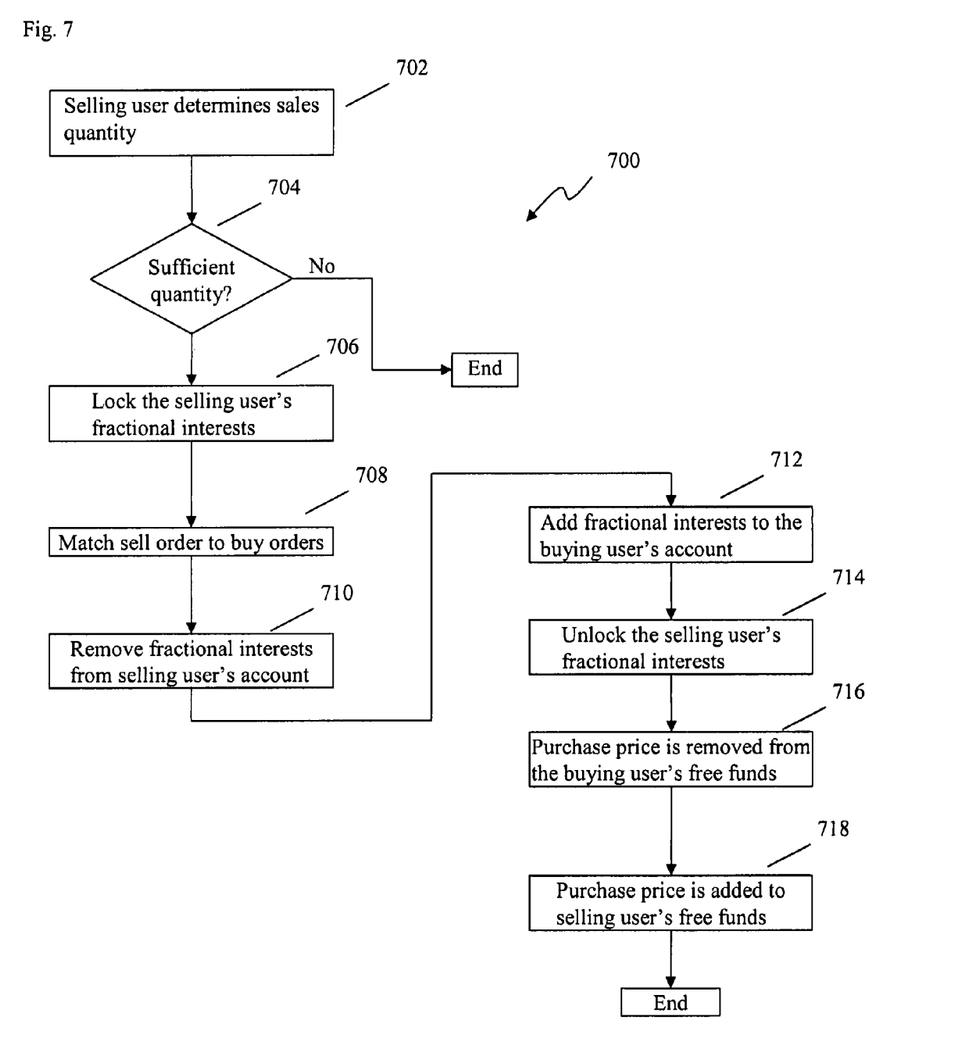
FIG. 7 is a flow diagram of the sale of a synthetic asset in the secondary market in one embodiment of the present invention.

Referring now to FIG. 7, a flow diagram of the sale of a synthetic asset in the secondary market is shown. At step 702, a user determines the number of fractional interests in a synthetic asset that he desires to sell. In one embodiment, this can result in a sell request being performed. In one embodiment, the user can determine the synthetic asset that will be for sale, a desired sales price, and the number of fractional interests available to make available at that price. At step 704, the system determines if the selling user's account contains sufficient fractional interests in the synthetic asset. In another embodiment, a user can set a minimum sales price for a particular number of fractional interests. In a further embodiment, a user could sell all or none of the fractional interests in a synthetic asset.

At step 706, a lock is placed onto the fractional interests in the synthetic asset. The lock can indicate to the system that the fractional interests are not available for sale other than for the current proposed transaction.

At step 708, the system determines if there are any buy requests that match the price and number of fractional interests and matches the sell request to the buy request. In one embodiment, if no matches are located, then the system may periodically re-query to locate any newly placed buy requests that match the price and number of fractional interests. In one embodiment, the sell request may be time-limited before it is canceled.

At step 710, the fractional interests are removed from the selling user's account. At step 712, the fractional interests are added to the buying user's account. At step 714, the lock on the seller's fractional interests is removed.

At step 716, the purchase price is removed from the free funds in the buying user's account. At step 718, the purchase price is added to the free funds in the selling user's account.

In one embodiment, if the fractional interests are tagged as IPO fractional interests, then the reserved funds in the selling user's account that was allocated to those IPO fractional interests when the synthetic asset was acquired is designated as free funds. As a result, in this embodiment, the acquisition price of the fractional interests when first acquired is not taken from the user, as it will be designated as free funds in the selling user's account once that user has sold the fractional interests on the secondary market. In one embodiment, if the selling user sells only a portion of that user's fractional interests in the IPO fractional interests, then the reserved funds that are designated as free funds as a result of a sale on the secondary market is designated on a pro-rata basis based on the total fractional interests owned by that user of that synthetic asset and the number of fractional interests of that synthetic asset actually sold by the selling user. As a result, as an IPO fractional interest is liquidated in the secondary market to another user, the selling user's account receives two sums of money. First, the reserved funds associated with the IPO fractional interest are designated as free funds in the selling user's account. Second, the selling user receives any amounts received from a user buying the IPO fractional interest of the selling user in the secondary market. After liquidation of the IPO fractional interest, the sum of both amounts are designated as free funds in the selling user's account and the IPO fractional interest is designated a regular (non-IPO) fractional interest. One manner of designating an IPO fractional interest as a regular fractional interest is to remove a tag in a field in a database associated with the fractional interest or associating a value with the fractional interest.

In one embodiment, a synthetic asset can be declared to have insufficient value. For example, the system may determine that there has not been sufficient interest or buy-sell activity in a fractional interest to sustain the applicable synthetic asset. In the event a synthetic asset is of little or no value, the funds originally reserved to acquire the IPO fractional interest for the synthetic asset are designated as free funds. Upon liquidation of any IPO fractional interest, a user does not receive less than the reserved funds amount set aside for the original transfer of the IPO fractional interest from the primary market.

However, in an alternative embodiment, rather than removing the IPO designation or tag associated with the fractional interest, the amount of reserved funds in the selling user's account may be correspondingly reserved in the buyer's user account. For example, if the IPO fractional interest had been initially purchased for $5 (and thus $5 was placed in that user's reserved funds), then as a result of the subsequent purchase by a second user, the $5 in the first user's reserved funds would be designated as free funds and $5 of the second user's free funds would be designated as reserved funds. In this manner, the aggregate reserved funds of all users will equal the purchase price that was paid by all users of all synthetic interest in the primary market.

Figure 8:
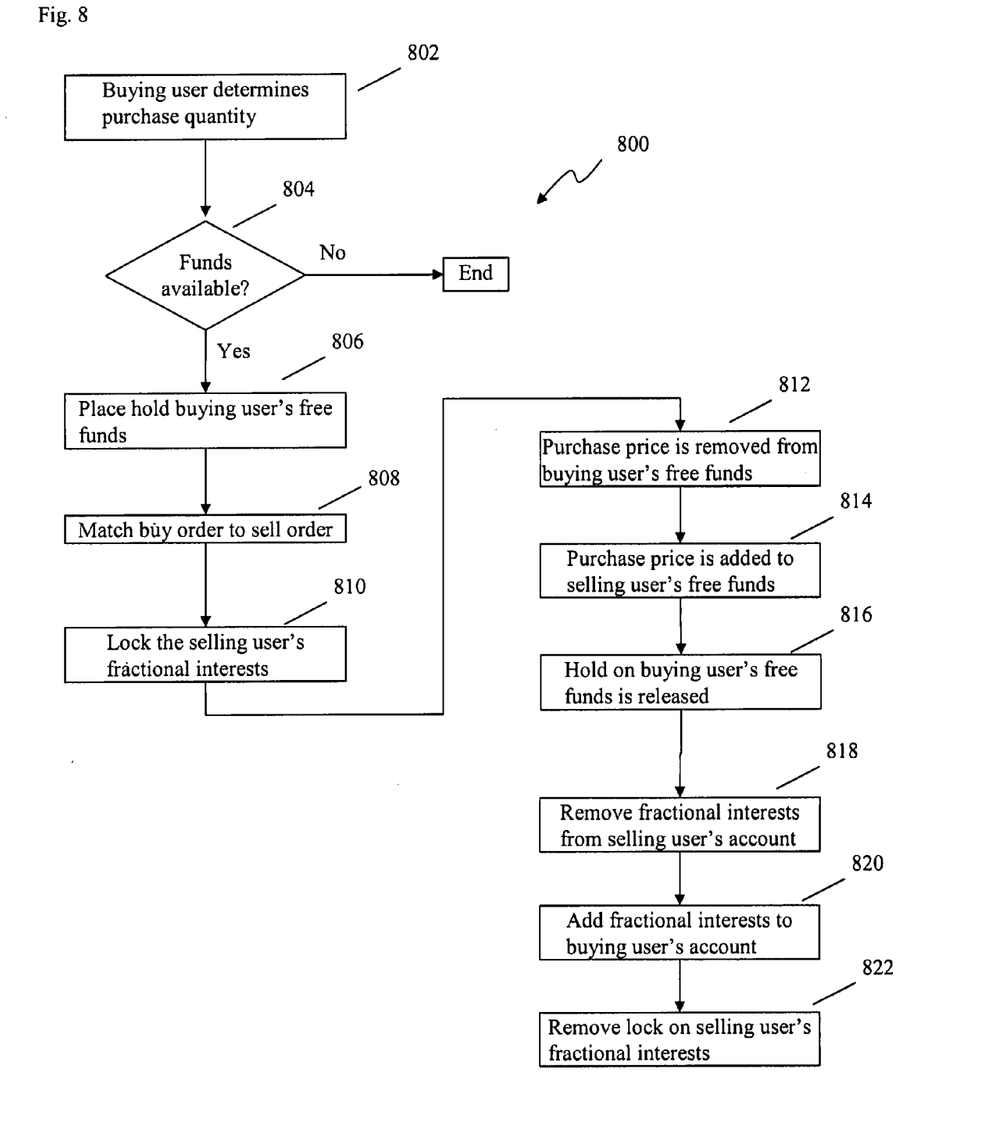
FIG. 8 is flow diagram of the purchase of fractional interests in one embodiment of the present invention.

Referring now to FIG. 8, a flow diagram of the purchase of fractional interests is shown. At step 802, a buying user initiates a buy request indicating the synthetic asset desired and the quantity of fractional interests. In one embodiment, the buy request can set forth a desired purchase price. In another embodiment, the buy request can set forth the fractional interests (or a combination of fractional interests and funds) that the buying user would be willing to trade in exchange for the synthetic asset desired. In a further embodiment, a user could buy all or none of the fractional interests in a synthetic asset.

Additionally, the system could provide the capability to a buying user to use an alternative name or identifier when attempting to purchase a synthetic asset. One potential purpose would be to enable the buying user to hide his association with a particular legal entity (i.e., brokerage firm) when purchasing a synthetic asset.

At step 804, the system determines if the buying user's free funds are sufficient for the purchase request. At step 806, a hold is placed on the buying user's free funds.

At step 808, the system determines if there are any seller requests that match the price and number of fractional interests and matches the buy request to the sell request. In one embodiment, if no matches are located, then the system may periodically re-query to locate any newly placed sell requests that match the price and number of fractional interests. In one embodiment, the buy request may be time-limited before it is canceled.

At step 810, a lock is placed onto the fractional interests in the synthetic asset in the selling user's account. The lock can indicate to the system that the fractional interests are not available for sale other than for the current proposed transaction.

At step 812, the purchase price is removed from the free funds in the buying user's account. At step 814, the purchase price is added to the free funds in the selling user's account. At step 816, the hold on the buying user's free funds is released.

At step 818, the fractional interests are removed from the selling user's account. At step 820, the fractional interests are added to the buying user's account. At step 822, the lock on the seller's fractional interests is removed.

Figure 9:
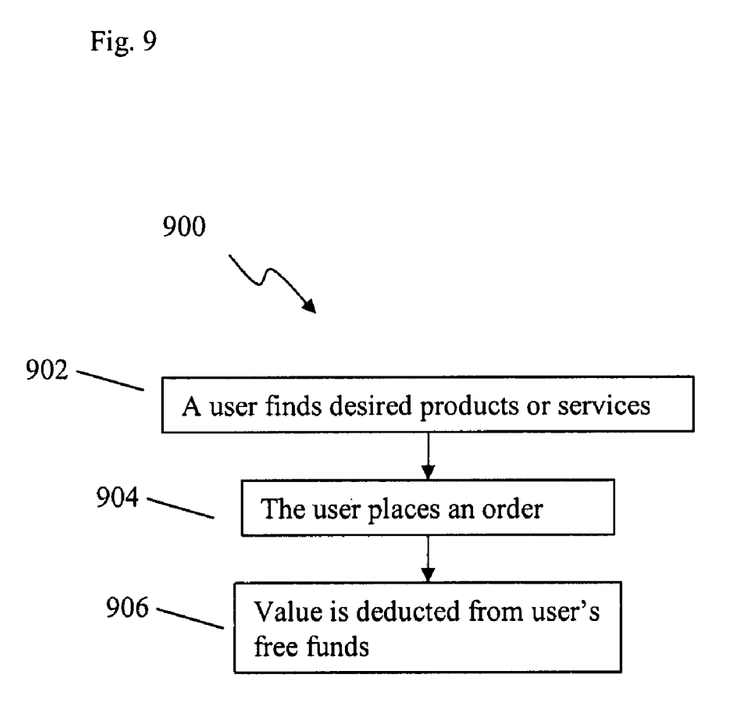
FIG. 9 is a flow diagram of the purchase and sale of products or services that are not synthetic assets in one embodiment of the present invention.

Referring now to FIG. 9, a flow diagram of the purchase and sale of products or services that are not synthetic assets is shown. At step 902, a user locates a product or service that the user desires to purchase. At step 904, the user places an order for the desired product or service. At step 906, the purchase price for the product or service is deducted from the user's free funds.

It is understood that many alternatives and additional functionality would be available for different embodiments contemplated herein. For example, selling user may "short" synthetic asset, and sell fractional interests in advance of purchasing fractional interests. Alternatively, there could be options, futures, forward contracts, derivatives, and other actions similar to banking, finance, and investment activities, with respect to the synthetic assets and fractional interests in synthetic assets.

Figure 10:
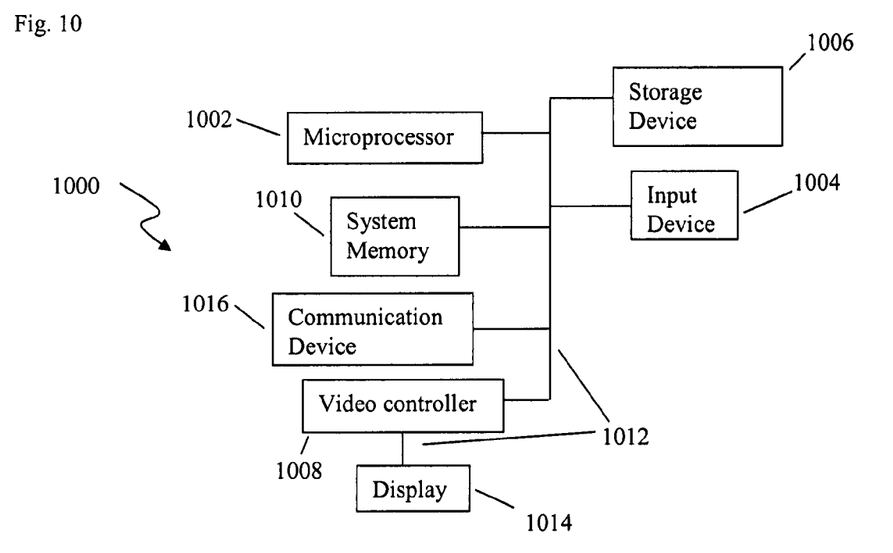
FIG. 10 is a schematic illustration of a node for implementing an embodiment of the present invention.

It will also be understood by those having skill in the art that one or more (including all) of the modules, elements, or steps of the present disclosure may be implemented using software executed on a general purpose computer system or networked computer systems, using special purpose hardware-based computer systems, or using combinations of special purpose hardware and software. Referring to FIG. 10, schematic illustration of a node 1000 for implementing an embodiment of the present invention is depicted. Node 1000 includes a microprocessor 1002, an input device 1004, a storage device 1006, a video controller 1008, a system memory 1010, and a display 1014, and a communication device 1016 all interconnected by one or more buses 1012. The storage device 1006 could be a floppy drive, hard drive, CD-ROM, optical drive, or any other form of storage device. In addition, the storage device 1006 may be capable of receiving a floppy disk, CD-ROM, DVD-ROM, or any other form of computer-readable medium that may contain computer-executable instructions. Further communication device 1016 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Moreover, while different steps, processes, and procedures are described as appearing as distinct acts, it is understood that the steps, process, and procedures could also be performed in different orders, simultaneously, or sequentially. Additionally, the steps, processes, and procedures could be merged into one or more steps, processes, or procedures.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
at least one processor; and
at least one memory device electronically coupled to the at least one processor, in which the at least one memory device stores instructions which, when executed by the at least one processor, direct the at least one processor to:
create at least one synthetic asset, wherein the at least one synthetic asset includes an intangible representation of a person;
create a plurality of fractional interests in the at least one synthetic asset, wherein the number of the plurality of fractional interests is determined based on the number of requests from users indicating a desire to acquire at least one of the plurality of fractional interests;
determine an initial price of the plurality of fractional interests;
make the plurality of fractional interests available in a trading module;
receive an acquisition request from a user indicating a desire to acquire at least one of the plurality of fractional interests;
receive funds from the user; and
designate a portion of the received funds as reserved funds of the user.

2. The apparatus of claim 1, wherein the at least one processor is further operable to:
designate the plurality of fractional interests as IPO fractional interests in the primary market;
receive a purchase request from a second user indicating a desire to acquire at least one of the plurality of fractional interests;
designate the reserved funds as free funds of the user;
transfer funds from the second user to the user; and
remove the IPO fractional interest designation from the plurality of fractional interests.

3. The apparatus of claim 1, wherein the trading module:
increases a number of the plurality of fractional interests in the secondary market; and
decreases a price of the plurality of fractional interests in the secondary market;
when a price of the plurality of fractional interests reaches a pre-determined maximum price.

4. The apparatus of claim 1, wherein the trading module:
decreases a number of the plurality of fractional interests in the secondary market; and
increases a price of the plurality of fractional interests in the secondary market;
when a price of the plurality of fractional interests reaches a pre-determined minimum price.

5. The apparatus of claim 1, wherein the initial price of the plurality of fractional interests is set to zero.

6. The apparatus of claim 1, wherein the initial price of the plurality of fractional interests is assigned by the processor.

7. The apparatus of claim 1, wherein the initial price of the plurality of fractional interests is not set.

8. The apparatus of claim 1, wherein the at least one processor is further operable to: periodically generate a query to locate subsequently placed orders to match with the at least one existing order if the existing order was not previously matched.

9. An apparatus comprising:
at least one processor; and
at least one memory device electronically coupled to the at least one processor, in which the at least one memory device stores instructions which, when executed by the at least one processor, direct the at least one processor to:
provide a user with access to data associated with at least one synthetic asset, wherein a synthetic asset is an intangible representation of a person;
prompt the user to submit a request to acquire at least one of the plurality of fractional interests for the at least one synthetic asset;
designate a value to acquire at least one of the plurality of fractional interests as reserved funds with an account associated with the user;
notify the user that the acquired fractional interests are transferred to the portfolio in the account associated with the user; and
notify the user that the funds designated as reserved funds are transferred from the account associated with the user.

10. The apparatus of claim 9, wherein the processor is further operable to:

prompt the user to submit a request to sell at least one of the plurality of fractional interests in the at least one synthetic asset;

notify the user that a lock is placed onto the at least one of the plurality of fractional interests for the at least one synthetic asset;

notify the user that the at least one of the plurality of fractional interests are transferred to the portfolio in the account associated with the acquirer of said fractional interests; and notify to the user that the funds are credited to the account associated with the user.

11. The apparatus of claim 9, wherein the processor is further operable to prompt the user to create a personalized profile comprising data compiled from news related to the at least one synthetic asset.

12. The apparatus of claim 9, wherein the processor is further operable to facilitate social networking.

13. The apparatus of claim 9, wherein the processor is further operable to facilitate audio and/or video broadcasting and conferencing.

14. The apparatus of claim 9, wherein, the data associated with at least one synthetic asset comprises at least one of: an asset identifier, a price, a number of fractional interests, the total market capitalization, the percentage ownership, a funds position summary, a transaction summary, a portfolio summary, and a data ticker.

15. The apparatus of claim 14, wherein the data ticker is a real-time value crawl showing the change in value of the at least one synthetic asset.

16. The apparatus of claim 9, wherein the instructions, when executed by the at least one processor, further direct the at least one processor to provide the user with access to an advertising and product-purchase section that is used for at least one of: advertising of at least one product or services; and providing the user with the ability to purchase at least one of the advertised products or services.

17. An apparatus comprising:
at least one processor; and
at least one memory device electronically coupled to the at least one processor, in which the at least one memory device stores instructions which, when executed by the at least one processor, direct the at least one processor to:
receive an offer to sell at least one of the plurality of fractional interests in at least one synthetic asset, wherein, the at least one synthetic asset is an intangible representation of a person, and wherein the offer to sell comprises a price and a number of fractional interests;
receive an acquisition request from a user indicating a desire to acquire at least one of the plurality of fractional interests, wherein the acquisition request comprises a price and a number of fractional interests;
in response to determination that the price in the offer matches the price in the acquisition request:
match the offer to sell and the acquisition request thereby executing a trade;
designate a value to acquire at least one of the plurality of fractional interests as reserved funds with an account associated with the acquirer of fractional interests;
place a lock onto the at least one of the plurality of fractional interests with a portfolio associated with the seller of fractional interests;
transfer reserved funds from the account associated with the acquirer of fractional interests to the account associated with the seller of fractional interests; and
transfer the at least one fractional interest from the portfolio in the account of the seller of fractional interests to the account associated with the acquirer of fractional interests.

\* \* \* \* \*